United States Patent
Akiyama et al.

(10) Patent No.: US 7,493,765 B2
(45) Date of Patent: Feb. 24, 2009

(54) HYDROGEN PRODUCTION METHOD AND APPARATUS AND ENGINE EMPLOYING HYDROGEN PRODUCTION APPARATUS

(75) Inventors: Tomohiro Akiyama, Sendai (JP); Masaki Hayasaka, Shiogama (JP); Hiroshi Uesugi, Yokohama (JP); Motoyuki Tsuihiji, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1030 days.

(21) Appl. No.: 10/805,344

(22) Filed: Mar. 22, 2004

(65) Prior Publication Data

US 2005/0042165 A1    Feb. 24, 2005

(30) Foreign Application Priority Data

Mar. 25, 2003 (JP) ............................. 2003-083518
Mar. 18, 2004 (JP) ............................. 2004-78402

(51) Int. Cl.
  *B01J 7/00* (2006.01)
  *F03G 7/00* (2006.01)
  *C01B 3/06* (2006.01)
  *C01B 3/08* (2006.01)

(52) U.S. Cl. ..................... 60/721; 48/61; 423/648.1; 423/657

(58) Field of Classification Search ................ 423/657, 423/648.1; 60/721; 48/61
See application file for complete search history.

(56) References Cited

U.S. PATENT DOCUMENTS

| | | | | |
|---|---|---|---|---|
| 1,752,187 A | * | 3/1930 | Lefebvre | 422/209 |
| 2,721,789 A | * | 10/1955 | Gill | 422/202 |
| 3,895,102 A | * | 7/1975 | Gallagher | 423/657 |
| 4,370,163 A | * | 1/1983 | Moriwaki et al. | 420/582 |
| 4,631,170 A | * | 12/1986 | Ohnishi et al. | 420/455 |
| 5,536,586 A | * | 7/1996 | Tsushio et al. | 428/649 |
| 6,899,862 B2 | * | 5/2005 | Baldwin et al. | 423/657 |
| 2002/0048548 A1 | * | 4/2002 | Chaklader | 423/657 |

FOREIGN PATENT DOCUMENTS

| | | | |
|---|---|---|---|
| BE | 845885 | * | 12/1976 |
| DE | 2739957 | * | 4/1978 |
| DE | 10155171 | * | 11/2000 |
| JP | A 60-4697 | | 1/1985 |
| JP | A 8-115733 | | 5/1996 |

(Continued)

OTHER PUBLICATIONS

Lefebvre, F, "New method for the immediate production of hydrogen under pressure or in the field in the absence of a supply of water", Chim. Ind. (Paris) (Jan. 1, 1928); vol./Issue: 20, pp. 231-232.*

*Primary Examiner*—Wayne Langel
(74) *Attorney, Agent, or Firm*—Oliff & Berridge, PLC (57) ABSTRACT

There is provided a hydrogen production apparatus having a simple structure for efficiently producing hydrogen. The hydrogen production apparatus 10 comprises a reactor 12 for reacting silicon (which may be waste silicon) and an aqueous basic hydroxide solution, a hydrogen absorbing alloy 20 for storing hydrogen produced by the reaction, and a reservoir/filter 14 which retains a solid or liquid product generated in the reactor 12 and filters a solution or suspension containing the solid or liquid product so as to separate the product from water.

5 Claims, 6 Drawing Sheets

FOREIGN PATENT DOCUMENTS

| | | | |
|---|---|---|---|
| JP | A 10-208755 | | 8/1998 |
| JP | 2000-191303 | * | 7/2000 |
| JP | A 2000-191303 | | 7/2000 |
| JP | 2001-231609 | * | 8/2001 |
| JP | A 2001-213609 | | 8/2001 |
| JP | 2002-8706 | * | 1/2002 |
| JP | B2 3316484 | | 6/2002 |

* cited by examiner

HYDROGEN PRODUCTION METHOD AND APPARATUS AND ENGINE EMPLOYING HYDROGEN PRODUCTION APPARATUS

BACKGROUND OF THE INVENTION

1. Field of the Invention

The present invention particularly relates to a method and apparatus for producing hydrogen using waste silicon as a raw material, and an engine employing hydrogen production apparatus.

2. Description of the Related Art

Conventionally, hydrogen is mainly produced using natural gas as the raw material. More specifically, natural gas is subjected to steam reforming reaction to produce hydrogen and carbon monoxide. Further, by carrying out water gas shift reaction between carbon monoxide and water vapor, the produced gases are transformed into hydrogen and carbon dioxide. The hydrogen and carbon dioxide are then separated by membrane separation to obtain pure hydrogen. In other known methods, hydrogen is produced as a coke oven gas during iron fabrication or as a by-product generated during manufacture of caustic soda. Furthermore, it is also possible to produce hydrogen using solar cell, wind power, or biomass.

For example, Japanese Patent Laid-Open Publication No. Hei 8-115733 discloses producing hydrogen by arranging, in water, a heat-resistant electrode in contact with a reactive metal member, which may be an aluminum member or a magnesium member, that undergoes an electrothermal chemical reaction with water. Using this arrangement, electricity is conducted through the reactive metal member and the heat-resistant electrode to perform underwater electric discharge, so as to produce hydrogen by the electrothermal chemical reaction between the reactive metal member and water.

Japanese Patent Laid-Open Publication No. Hei 10-208755 describes generating hydrogen by allowing a catalyst to contact water heated to 100° C. or below, so as to decompose water.

Despite the above methods, there still exists a need for a technique which realizes stable mass production of hydrogen at a low cost, in light of the forthcoming age of full cells requiring much more hydrogen production.

In recent years, a hydrogen production method which is more inexpensive than conventional methods has been proposed. According to this method, silicon and an alkali liquid are reacted to generate hydrogen.

For example, Japanese Patent Laid-Open Publication No. 2000-191303 discloses a hydrogen production apparatus in which scrap silicon from a semiconductor device manufacturing line is ground into particles having a diameter between several ten to several hundred μm, the pH level of an alkali drain liquid from a semiconductor device manufacturing line is adjusted, and the scrap silicon and the alkali drain liquid are subsequently reacted at 50° C. or above.

Japanese Patent Laid-Open Publication No. 2001-213609 describes a hydrogen production method in which, in order to prevent generation of a violent reaction immediately after the contact between silicon and an alkali liquid, silicon and water are mixed to form a slurry in advance, and the silicon slurry and an alkali liquid are subsequently reacted. It is disclosed that, according to this method, hydrogen gas having a maximum hydrogen pressure of approximately 0.2 MPa can be obtained.

In a silicon wafer manufacturing process, semiconductor products are fabricated by cutting and polishing monocrystalline silicon. The fabrication yield is limited to about 20-25%, consequently generating a large amount, namely, 75-80%, of silicon as waste silicon powder in a slurry state. Typically, the composition of the waste silicon powder is approximately 90% high-purity silicon and approximately 10% silicon oxide. Very recently, as disclosed in the specification of Registered Japanese Patent No. 3316484, it became possible to continuously separating silicon cakes from drain water containing the waste silicon powder.

It is therefore desired to provide a method and apparatus for reusing the separated silicon cakes.

Further, as explained above, there exists a need for a low-cost hydrogen production method.

SUMMARY OF THE INVENTION

The present invention was conceived in light of the above to provide a method and apparatus in which recovered waste silicon is added and mixed in an aqueous hydroxide solution to produce hydrogen having an atmospheric pressure or a higher pressure while oxidizing the silicon, and an engine employing such a method and apparatus.

In a hydrogen production method according to the present invention, silicon and an aqueous basic hydroxide solution are reacted to produce hydrogen, and hydrogen produced by this reaction is obtained in a high pressure state exceeding 0.2 MPa at 25° C.

According to this method, hydrogen can be produced more easily compared to when using conventional hydrogen production methods. Further, hydrogen in the high pressure state specified above can be sufficiently occluded in a material such as a hydrogen absorbing alloy without applying any additional pressure, thereby allowing produced hydrogen to be stored in a compressed state.

In the present production method, the silicon may be waste silicon and crushed wafer scraps generated during semiconductor fabrication, and the waste silicon may be in any one of the states of water-containing solution, slurry, or cake.

During semiconductor fabrication, as explained above, about 80% of monocrystalline silicon becomes waste silicon through cutting and other processes. By employing the waste silicon, silicon can be effectively recycled. Further, according to the present production method, waste silicon in any of the above-noted states can be used to react with the aqueous basic hydroxide solution to produce hydrogen. Because waste silicon may be extracted in any of the above-noted states, waste silicon can be recycled at any point during drain water treatment for hydrogen production.

According to another aspect of the present production method, hydroxide in the aqueous basic hydroxide solution may comprise at least one selected from the group consisting of potassium hydroxide, sodium hydroxide, magnesium hydroxide, calcium hydroxide, beryllium hydroxide, and iron hydroxide.

By particularly employing an aqueous solution of alkali metal or alkali earth metal hydroxide listed above, hydrogen producing reaction can be enhanced, thereby achieving efficient hydrogen production.

According to a further aspect of the present production method, hydrogen produced and obtained in the high pressure state may be either occluded in a hydrogen absorbing alloy or injected into a high-pressure cylinder.

A hydrogen production apparatus according to the present invention comprises reacting means for reacting silicon and an aqueous basic hydroxide solution to produce hydrogen such that hydrogen produced by this reaction is obtained in a high pressure state exceeding 0.2 MPa at 25° C.

The present hydrogen production apparatus may further comprise hydrogen storing means for storing hydrogen produced in the reacting means.

With this arrangement, the apparatus can be simplified compared to conventional hydrogen production devices.

The present hydrogen production apparatus may further comprise retaining means for retaining a solid or liquid product generated in the reacting means, and dehydrating means for removing moisture from the product retained in the retaining means.

Using this arrangement, a reusable solid or liquid product can be temporarily retained in the retaining means, and reuse of the product can be facilitated by dehydrating the product. Further, water obtained in the dehydrating means may be employed again for the aqueous basic hydroxide solution.

According to another aspect of the present production apparatus, the hydrogen storing means may comprise a hydrogen absorbing alloy.

An engine according to the present invention comprises a hydrogen production apparatus for reacting silicon and an aqueous basic hydroxide solution to produce hydrogen, and a fuel cell for generating electricity using hydrogen obtained from the hydrogen production apparatus.

Compared to a conventional device such as a reformer for supplying hydrogen to a fuel cell, the present engine achieves hydrogen production using a simpler structure. Further, because hydrogen can be substantially constantly produced, engine running time may be extended. When waste silicon is employed, fuel cost of the engine can be greatly reduced.

A vehicle according to the present invention includes the above-described engine mounted thereon.

Because hydrogen production can be performed using a structure that is simpler and more compact compared to a conventional reformer or the like for supplying hydrogen to a fuel cell, approximately the same amount of space inside a vehicle can be available when the present engine is mounted on the vehicle. By using waste silicon, the engine fuel cost can be greatly reduced.

DESCRIPTION OF PREFERRED EMBODIMENTS

Preferred embodiments of the present invention are described below referring to the drawings.

[Hydrogen Production Apparatus and Hydrogen Production Method]

Figure 1:
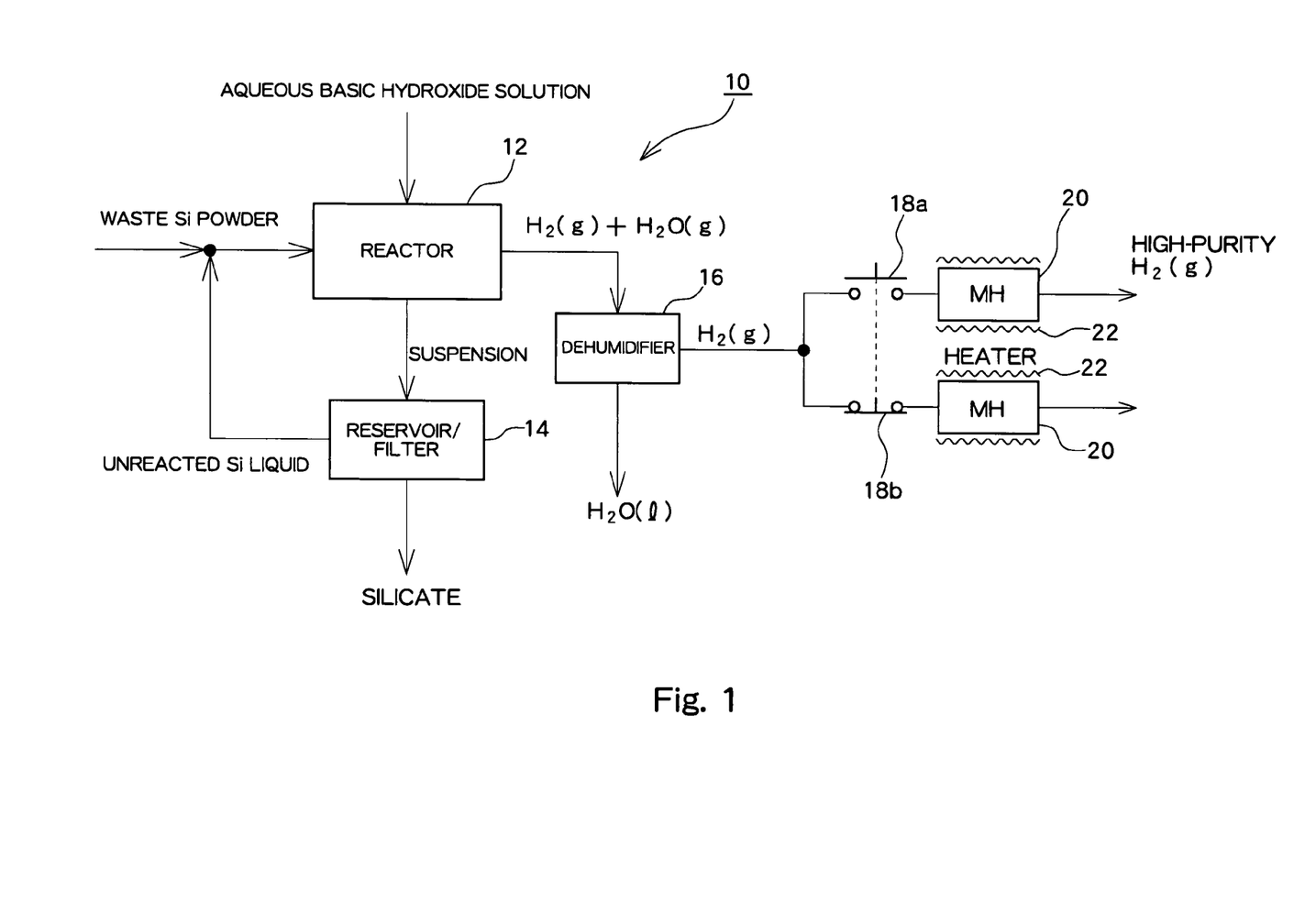
FIG. 1 is a diagram illustrating a configuration of a hydrogen production apparatus according to an embodiment of the present invention.

FIG. 1 illustrates an example configuration of a hydrogen production apparatus according to the present invention. As shown, a hydrogen production apparatus 10 according to the present embodiment comprises a reactor 12, which is reacting means for reacting silicon (Si) and an aqueous basic hydroxide solution. The apparatus 10 further includes hydrogen storing means for storing hydrogen produced in the reactor 12 by a reaction described below in detail. The apparatus 10 also includes a reservoir/filter 14, which comprises retaining means for retaining a solid or liquid product generated in the reactor 12 and dehydrating means for removing moisture from the product retained in the retaining means.

Figure 10:
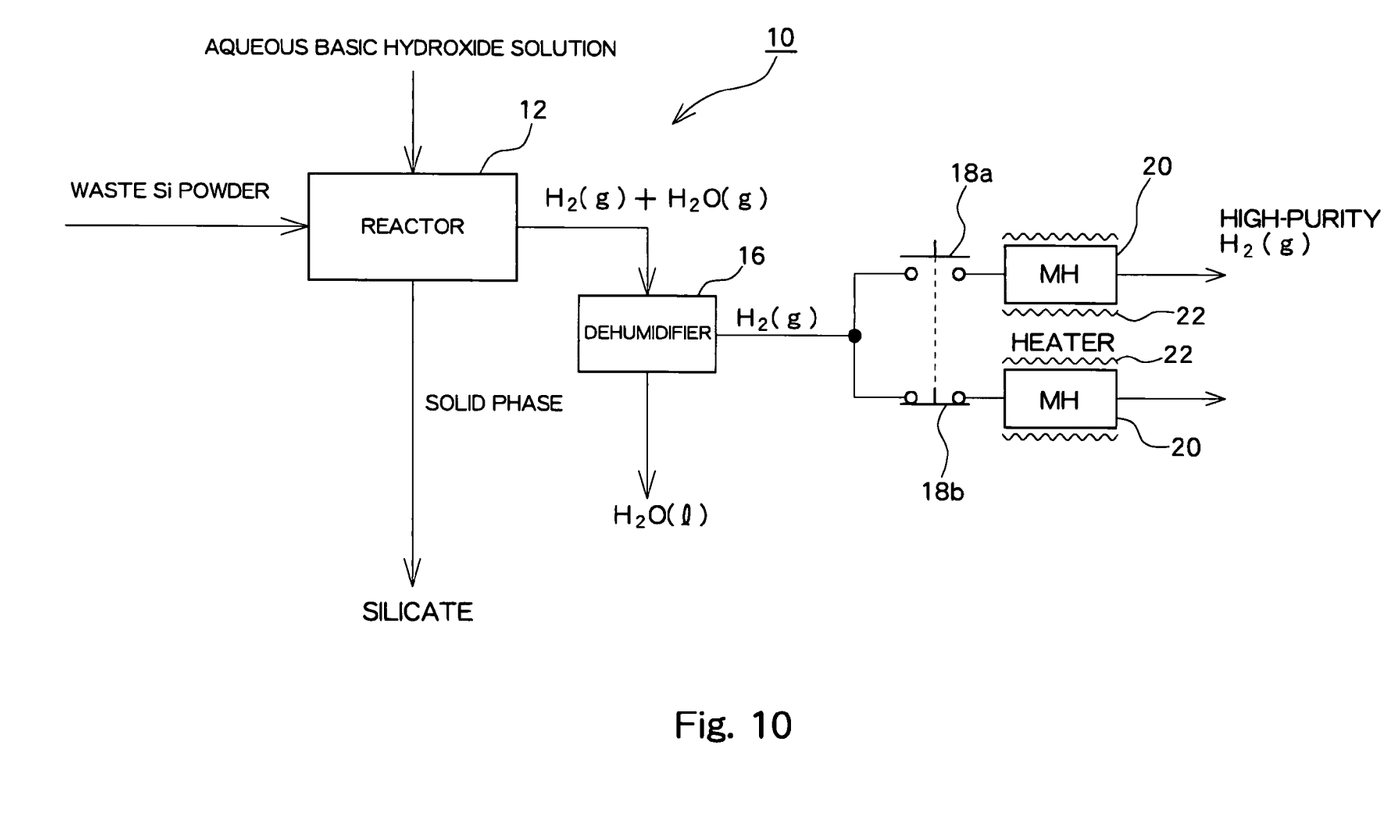
FIG. 10 is a diagram illustrating a configuration of a hydrogen production apparatus according to another embodiment of the present invention.

As shown in FIG. 10, it is also possible to directly extract a solid phase from the reactor 12 by adjusting moisture within the reactor 12.

The components of the hydrogen production apparatus 10 according to the present embodiment will next be described in further detail. The reactor 12 preferably includes mixing means for promoting the reaction. The mixing means may comprise a mixing member having agitating blades, an ultrasonic vibrator, a homogenizer, or a circulatory mixing device in which a part of the reaction liquid is removed from a lower portion of the reactor 12 and added back again to an upper portion of the reactor 12.

The hydrogen storing means may comprise a hydrogen absorbing alloy 20 as shown in FIG. 1, or alternatively be a cylinder or the like. A hydrogen absorbing alloy 20 is known to occlude hydrogen when hydrogen in a high pressure state is supplied. In the hydrogen production apparatus 10 according to the present embodiment which can continuously supply high-pressure hydrogen via the reaction described below, switches 18a, 18b may be used to switch between lines connected to pressure-resistant containers (not shown) in which the hydrogen absorbing alloys 20 are placed, so as to allow continuous occlusion of high-pressure hydrogen. The present invention is not limited to this configuration, and, when the hydrogen production apparatus 10 is of a batch production type, high-pressure hydrogen may be supplied to a pressure-resistant container by opening and closing a valve, instead of using the switches 18a, 18b.

The pressure-resistant container includes a heater 22 for heating the hydrogen absorbing alloy 20 so as to promote absorption of hydrogen.

At the same time as hydrogen is produced in the reactor 12 by the reaction described below, high pressure and high temperature result such that water in the reactor 12 is evaporated to generate water vapor. In order to separate gas obtained from the reactor 12 into hydrogen and water vapor, a dehumidifier 16 is provided between the reactor 12 and the hydrogen absorbing alloy 20. The dehumidifier 16 removes water vapor only, and hydrogen alone is delivered to the hydrogen absorbing alloy 20.

The reservoir/filter 14 temporarily retains and filters a solution or suspension containing a solid or liquid product generated by the reaction in the reactor 12, thereby separating the solution or suspension into the solid or liquid product and water. When the hydrogen production apparatus 10 is of a batch production type, the reaction in the reactor 12 becomes substantially completed at one point of time. The reservoir/ filter 14 can therefore simply perform separation of the solid or liquid product and water. In contrast, when the hydrogen production apparatus 10 is of a continuous production type, a part of or the entire reaction liquid is removed in accordance with an output from a sensor (e.g., pH meter or viscometer; not shown) provided in the reactor 12, and delivered to the reservoir/filter 14'. According to this configuration, unreacted silicon may be present in the reaction liquid. A filter type is therefore selected so as to separate water and unreacted silicon from the solid or liquid product. The separated water and unreacted silicon are then returned to the reactor 12, as shown in FIG. 1. When a pH meter is used as the above-referenced sensor, the removal of reaction liquid may be performed at the point when the pH value approaches 7. When a viscometer is used, the removal may be performed at the point when the viscosity of the solution in the reactor 12 exceeds a mixable level due to products other than hydrogen.

The above-noted silicon may be low-purity silicon, 99% purity silicon, or waste silicon generated during semiconductor fabrication.

For example, waste silicon may be generated during semiconductor wafer fabrication processes illustrated in FIGS. 3-9 and described below in detail.

Figure 3:
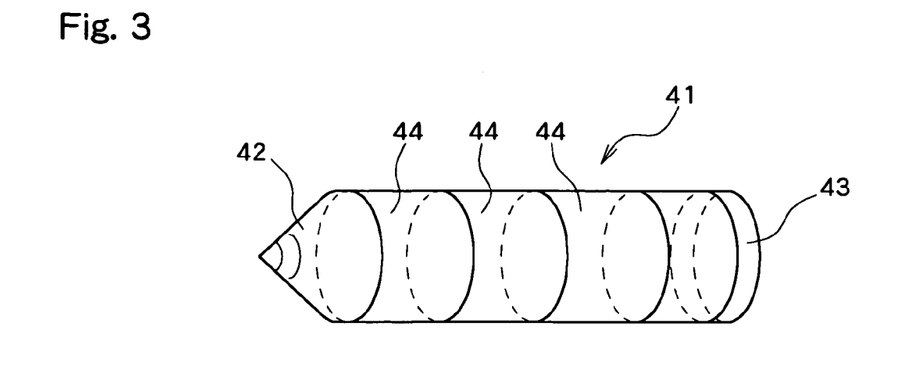
FIG. 3 is diagram for explaining cutting and polishing processes of a semiconductor crystal material.

FIG. 3 shows silicon monocrystal pulled up in ingot form, for example. The ingot may have dimensions of 8 inches by 2 meters. Unnecessary portions such as upper and lower ends 42, 43 of the ingot 41 are cut and removed, and the rest of the ingot 41 is cut into several cylindrical blocks 44. The cutting is performed using a blade (not shown) while supplying water. The process up to this point is referred to as the first cutting and polishing step.

Figure 4:
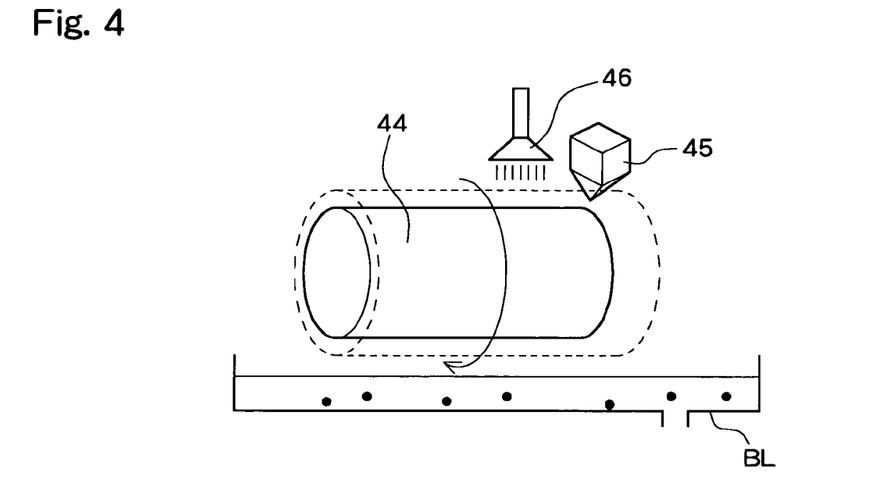
FIG. 4 is diagram for explaining cutting and polishing processes of a semiconductor crystal material.

Subsequently, as shown in FIG. 4, the outer periphery of a cylindrical block 44 is ground using a grinding blade 45 to obtain a desired wafer diameter. During this second cutting and polishing step, water is similarly showered via water supplying means 46 for protection of both the grinding blade 45 and the block 44.

Figure 5:
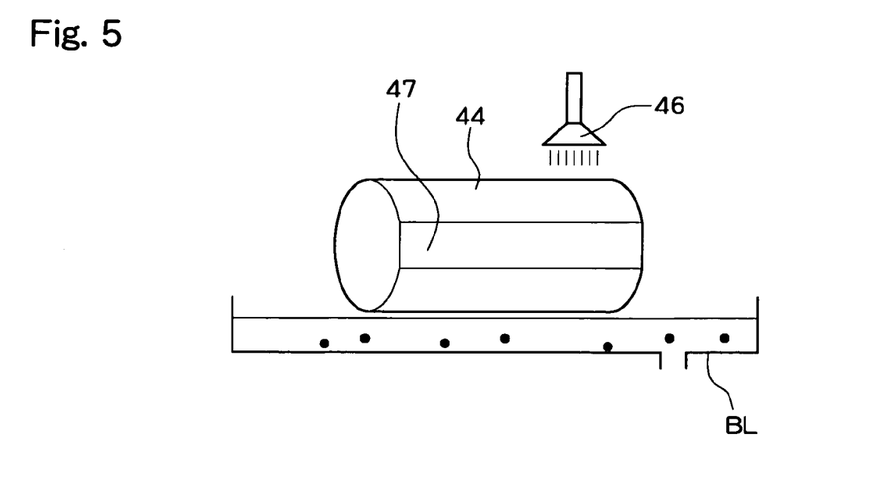
FIG. 5 is diagram for explaining cutting and polishing processes of a semiconductor crystal material.

As shown in FIG. 5, an orientation flat 47 for indicating the crystal orientation in the wafer surface is next formed on the block 44. Water is again sprayed by the supplying means 46 during this third cutting and polishing step.

Figure 6:
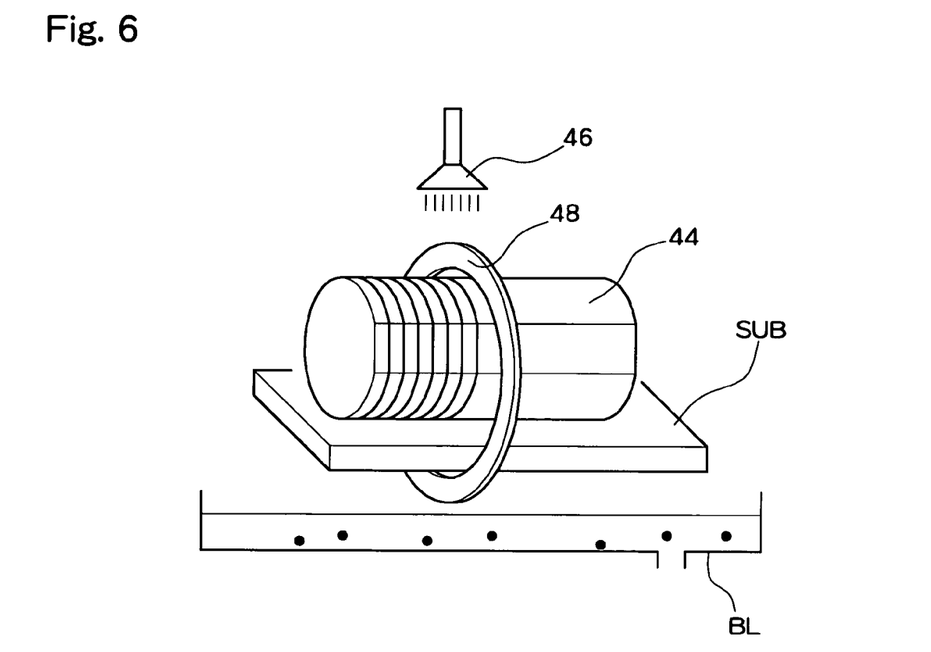
FIG. 6 is diagram for explaining cutting and polishing processes of a semiconductor crystal material.
Figure 7:
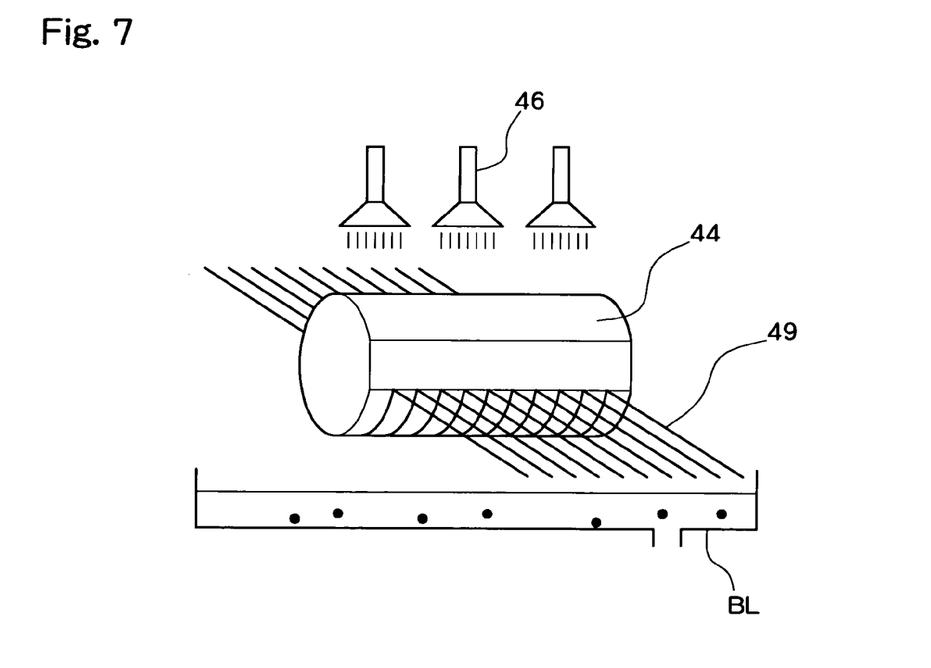
FIG. 7 is diagram for explaining cutting and polishing processes of a semiconductor crystal material.

Subsequently, as shown in FIGS. 6 and 7, the block 44 is attached to a supporting substrate SUB using an adhesive, and cut into individual wafers. In FIG. 6, the block 44 is sliced using a blade saw 48 having diamond particles attached thereto. Alternatively, in FIG. 7, piano wires 49 are arranged in tension, and a slurry of abrasive diamond grains is made to flow along the piano wires so as to slice the block 44. Water is again sprayed by the supplying means 46 during this step.

After the slicing, the adhesive is dissolved using a chemical solution to remove the wafers from the supporting substrate, thereby separating the individual wafers. As described below in further detail, if the adhesive and the chemical solution flow into a raw water tank as the drain water, the pH value of the drain water may become undesirably increased toward an alkali level. Accordingly, an arrangement is necessary for, when removing the adhesive from the wafers, preventing at least the drain water containing the chemical solution used for that purpose from flowing into the raw water tank. For example, the entire supporting substrate SUB may be transferred before performing the adhesive removal to a cleansing device having a drain path which is not connected to the raw water tank. The slicing and adhesive removal processes are referred to as the fourth cutting and polishing step.

Subsequently, chamfering is performed to prevent chipping of corner portions of a wafer. The wafer is then lapped. For example, corner portions of the side on the wafer outer periphery are chamfered. Additional chamfering may be performed on the two end portions of the orientation flat in contact with the outer peripheral side. The chamfering process is referred to as the fifth cutting and polishing step. Further, the upper and/or lower surfaces of the wafer are mechanically and chemically polished using a lapping device shown in FIG. 8. The lapping process is referred to as the sixth cutting and polishing step.

In the above-described first through sixth cutting and polishing steps, basically water alone is applied to the cutting and polishing means. The drain water is therefore almost entirely composed of water and Si.

The wafer is next shipped out as is or after doping with impurities and repairing surface defects to obtain perfect crystal.

This wafer is formed into desired ICs by a semiconductor manufacturer. The ICs are formed on the wafer in a matrix, and during this process, at least a passivation film composed of resin, silicon nitride, or the like is disposed on a surface of an IC. Typically, a polyimide resin layer is deposited as the uppermost layer. A silicon nitride film may additionally be provided under the polyimide resin layer.

Figure 8:
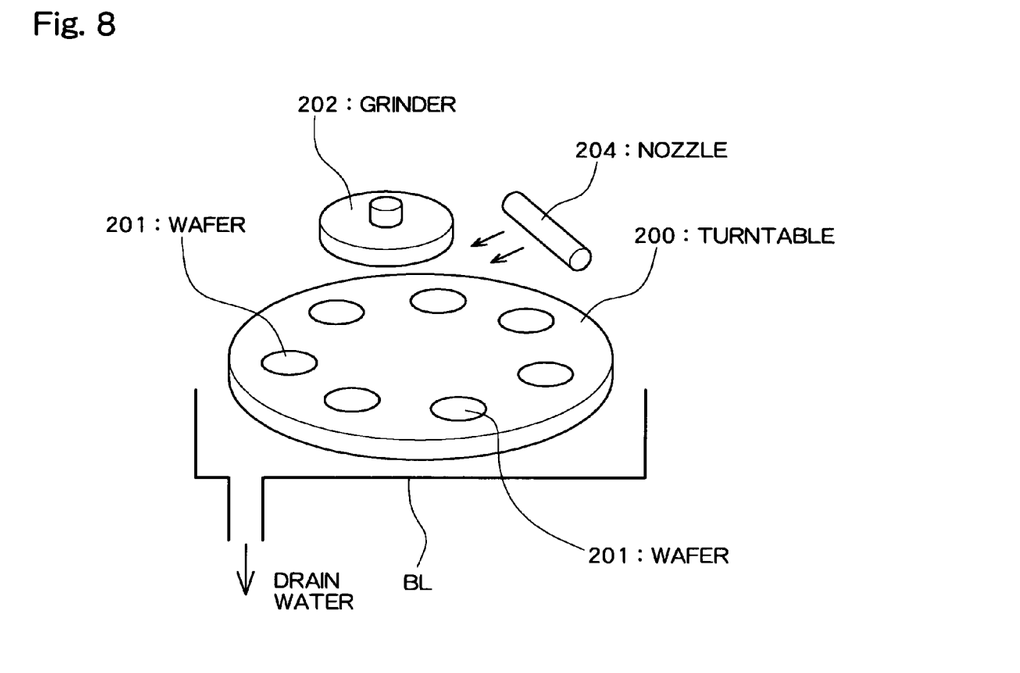
FIG. 8 is diagram for explaining cutting and polishing processes of a semiconductor crystal material.

The wafer at this point is generally too thick. In order to facilitate dicing, reduce electrical resistance of the rear surface, and reduce the thickness of the package, back lapping is performed to a thickness of approximately 300 μm or smaller, for example. A back lapping device is shown in FIG. 8. Wafers 201 are placed on a turntable 200, and the rear surfaces of the wafers 201 are scraped off by a grinder 202. A nozzle (shower) 204 supplies water. The back lapping process is referred to as the seventh cutting and polishing step.

Figure 9:
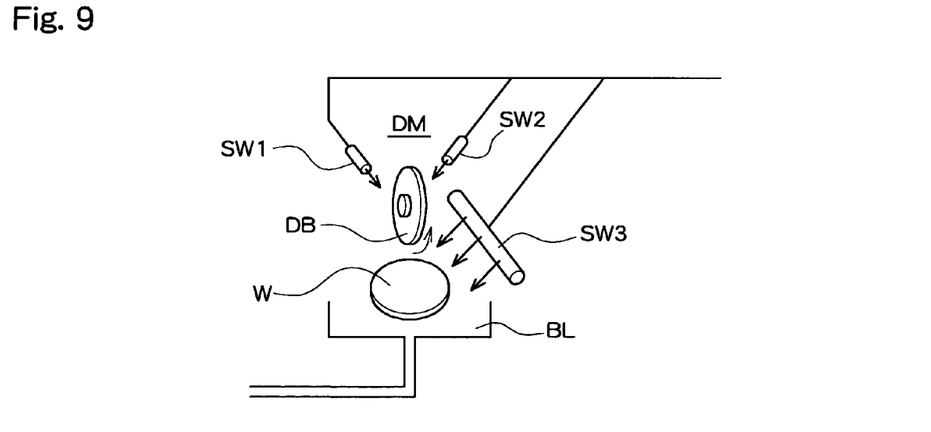
FIG. 9 is diagram for explaining cutting and polishing processes of a semiconductor crystal material.

Finally, the semiconductor wafer is diced as shown in FIG. 9. In FIG. 9, W denotes the semiconductor wafer, while DB denotes a dicing blade. SW1 and SW2 are showers for spraying water on the blade, and SW3 is a shower for spraying water on the wafer.

Because passivation film is typically removed at a dicing line, the wafer portion at a dicing line is composed of Si, silicon oxide, and interlayer insulation film. Dicing scraps therefore comprise scraps of these materials. However, it is also commonly known that, when the dicing is performed at a portion covered by a passivation film, scraps of the passivation film can be easily filtered and removed. The dicing process is referred to as the eighth cutting and polishing step.

In summary, materials discharged from the above-described wafer fabrication processes are mainly water and silicon, while additionally including silicon oxide and trace amounts of Al, SiGe, sealing resin, and the like.

The annual quantity of production of high-purity monocrystalline silicon in Japan only is estimated at about 4000 tons, while the worldwide estimate amounts to about 8000 tons. Although much electricity is consumed to fabricate silicon wafers from silica stone, approximately 80% of the high-purity monocrystalline silicon currently ends up as waste silicon and is treated as industrial waste.

According to the hydrogen production apparatus 10 of the present embodiment, waste silicon, which comprises high-purity silicon powder composed of processing scraps of monocrystalline silicon generated mainly during the above-described semiconductor fabrication and/or crushed scraps of defective wafers, and aqueous basic hydroxide solution are employed to produce hydrogen, thereby achieving recycling of waste silicon. The waste silicon used in the present embodiment is silicon powder having a diameter of approximately 3 μm, such that the surface area for generating chemical reaction is sufficiently large.

Figure 2:
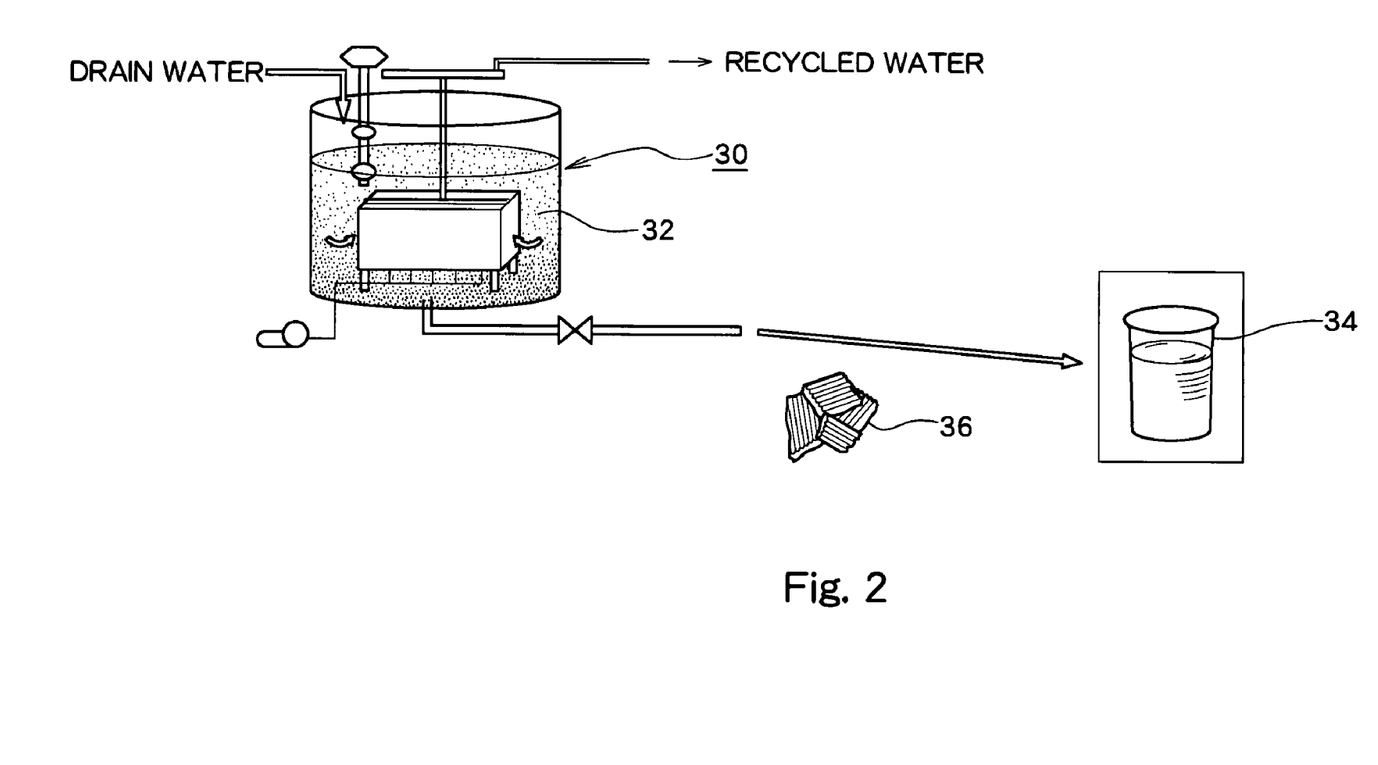
FIG. 2 is a diagram illustrating a configuration of a waste water treatment device for treating liquid containing waste silicon to be supplied to the hydrogen production apparatus according to an embodiment of the present invention.

FIG. 2 shows an example drain water treatment device 30 for treating drain water discharged from the above-described fabrication processes. The drain water treatment device 30 may be configured as the device described in the above-referenced Registered Japanese Patent No. 3316484.

The waste silicon supplied to the reactor 12 may be in the form of drain liquid 32 as discharged from the above-described fabrication processes, slurry drain liquid 34 obtained by concentrating silicon using the drain water treatment device 30, or waste silicon cake 36 obtained by filter-pressing the slurry drain liquid 34. For example, Si slurry can be concentrated to 50,000 ppm using the concentration device "Aqua Closer" (manufactured by SANYO Aqua Technology Co., Ltd.), and this concentrated Si slurry may be reacted with the aqueous basic hydroxide solution detailed below. Alternatively, Si powder aggregate in a semi-cake state obtained using the same concentration device to attain a higher Si concentration of 100,000 ppm, for example, may be reacted with the aqueous basic hydroxide solution detailed below. Because deionized water is typically employed to prevent wafer contamination during semiconductor chip fabrication processes and wafer back grinding and dicing processes, drain water from those processes can be directly added to the hydrogen generating reactor without requiring any arrangements for preventing generation of other unintended reactions. Further, because the amount of electricity consumed in fabricating chip products from Si ingots is very large, effective use of high-purity hydrogen and reuse of sodium silicate or the like are also very significant for environmental protection purposes.

The basic hydroxide according to the present invention may be an alkali metal or alkali earth metal. More specifically, the basic hydroxide preferably comprises at least one selected from a group consisting of potassium hydroxide, sodium hydroxide, magnesium hydroxide, calcium hydroxide, beryllium hydroxide, and iron hydroxide.

Reaction formulas for several of the above example substances are as follows:

Si+2NaOH+H$_2$O(l)→Na$_2$SiO$_3$+2H$_2$(g)+423.8 [kJ/mol]

Si+Mg(OH)$_2$+H$_2$O(l)→MgSiO$_3$+2H$_2$(g)+338.0 [kJ/mol]

Si+Ca(OH)$_2$+H$_2$O(l)→CaSiO$_3$+2H$_2$(g)+363.0 [kJ/mol]

Si+Be(OH)$_2$+H$_2$O(l)→BeSiO$_3$+2H$_2$(g)+229.6 [kJ/mol]

Si+Fe(OH)$_2$+H$_2$O(l)→FeSiO$_3$+2H$_2$(g)+339.5 [kJ/mol]

All of the above reactions are heat generating reactions promoted by basic hydroxides, by which a large quantity of hydrogen is efficiently produced in a short period of time such that hydrogen can be obtained in a high pressure state. According to the above reaction formulas, with respect to one mol of silicon in the reactor 12, any one of the hydroxides is preferably supplied in the amount of at least one or two mols, and water, preferably one mol or more. More preferably, the amount of added water with respect to one mol of silicon greatly exceeds one mol.

As described above, the present embodiment employs waste silicon which comprises high-purity silicon powder composed of waste Si scraps and Si scraps obtained by crushing defective wafers. Consequently, when using sodium hydroxide as the basic hydroxide according to the above-noted reaction formula, high-purity sodium silicate is generated in addition to hydrogen. This sodium silicate is known by the name of water glass, and can be effectively used as an adhesive for cementing artificial stones, glass, and ceramics, a material for manufacturing fire-resistant coating and acid-resistant coating, and as a cement additive or soil stabilizer for civil engineering and construction purposes. Further, high-purity magnesium silicate obtained by the above reaction can be used as an antacid, absorbent, filter aid, and catalyst. High-purity calcium silicate can be effectively employed as a fertilizer.

Hydrogen obtained by the above reactions is preferably in a high pressure state such that occlusion into the above-noted hydrogen absorbing alloy 20 is possible. The high pressure more preferably exceeds 0.2 MPa at 25° C.

The hydrogen absorbing alloy 20 may be, for example, an occluding alloy of magnesium, potassium, beryllium, aluminum, rare earth metal, titanium, or zirconium. More specifically, the hydrogen absorbing alloy 20 may be LaNi$_5$, LaNi$_{4.7}$Al$_{0.3}$, MmNi$_{4.5}$Al$_{0.5}$, MmNi$_{4.5}$Al$_{0.25}$Co$_{0.25}$, MmNi$_{4.5}$Al$_{0.25}$Mn$_{0.25}$, MmNi$_{3.55}$Mn$_{0.4}$Al$_{0.3}$CO$_{0.75}$, Ca(9.1 wt %)-Ni(85.1 wt %)-MmN(5.0 wt %)-Al(0.97 wt %), TiFe, TiFe$_{0.9}$Mn$_{0.1}$, FeTi$_{1.13}$-1.9 wt % Fe$_7$Ti$_{10}$O$_3$, TiFe$_{0.8}$Ni$_{0.15}$V$_{0.05}$, Ti$_{1.1}$Fe$_{0.8}$Ni$_{0.2}$Zr$_{0.05}$, TiCo$_{0.5}$Fe$_{0.5}$Zr$_{0.05}$, TiMn$_{1.5}$, Ti$_{0.8}$Zr$_{0.2}$Cr$_{0.8}$Mn$_{1.2}$, Ti$_{1.2}$Cr$_{1.2}$Mn$_{0.8}$, Zr$_{0.8}$Ti$_{0.2}$ (Fe$_{0.75}$V$_{0.15}$Cr$_{0.1}$)$_2$, or Mg$_2$Ni.

The hydride complex may be used to absorb hydrogen. The hydride complex may be, for example, NaAlH$_4$. NaAlH$_4$ releases hydrogen under 60° C., 2 atm.

3NaAlH$_4$→Na$_3$AlH$_6$+2Al+3H$_2$+37 [kJ/mol]

Na$_3$AlH$_6$→3NaH+Al+3/2H$_2$+37 [kJ/mol]

The above-mentioned reaction is reversible reaction. NaH absorbs hydrogen between two and three hours under 270° C., 175 atm.

By making use of waste silicon which amounts to about 80% of 8000 tons, the worldwide estimated annual silicon production amount, the quantity of hydrogen that can be obtained through the above-noted reactions may be determined by the following calculation as corresponding to the fuel consumption of 12,800 typical fuel cell vehicles (having hydrogen consumption of 800 Nm$^3$/year).

6400(t)×2×22.4÷28÷800×10$^3$=12,800 vehicles

Hydrogen obtained according to the present invention may be used, for example, as a raw material for chemical industry and fuel production, reducing agent, and fuel for hydrogen automobiles, hydrogen aircraft, mobile and home-use fuel cells.

It should be noted that waste silicon includes a small amount of silicon oxide. When sodium hydroxide is employed as the basic hydroxide, the following reaction occurs with respect to silicon oxide.

2NaOH+SiO$_2$→Na$_2$SiO$_3$+H$_2$O+84.6 [kJ/mol]

As can be seen in the above reaction formula, silicon oxide within the waste silicon does not generate hydrogen, but produces sodium silicate (water glass) which can be effectively used as described above, thereby making it possible to achieve Si recycling.

The above description mainly refers to a case in which the drain water discharged from the wafer fabrication processes comprises water and Si and possibly a small amount of silicon oxide. When the drain liquid contains a trace amount of sealing resin or flocculant, effective use of by-products generated in the reactor 12 in addition to hydrogen may be devised taking into consideration such trace contaminants.

[Engine and Vehicle Including Thereof]

An engine according to the present invention comprises a hydrogen production apparatus which produces hydrogen by reacting silicon and an aqueous basic hydroxide solution, and a fuel cell which generates electricity using hydrogen obtained from the hydrogen production apparatus.

Using this arrangement, hydrogen can be generated using a structure simpler compared to a conventional apparatus such as a reformer for supplying hydrogen to the fuel cell. Furthermore, because substantially constant hydrogen production can be achieved, engine running time maybe extended. When waste silicon is employed, fuel cost of the engine can be greatly reduced.

A vehicle according to the present invention includes the above-described engine mounted thereon.

Because hydrogen production can be performed using a structure that is simpler and more compact compared to a conventional reformer or the like for supplying hydrogen to a fuel cell as described above, approximately the same amount of space inside a vehicle can be available when the present engine is mounted on the vehicle. By using waste silicon, the engine fuel cost can be greatly reduced.

According to the above-noted reaction formula, assuming the equilibrium constant of $K_{298}=3.050 \times 10^{82}$, the following equation holds true at 25° C.

$$K_{298}=([Na_2SiO_3][H_2]^2)/[Si][NaOH]^2[H_2O])=3.050 \times 10^{82}$$

Here, denoted in the parentheses [ ] are activity values in units of partial pressure (atm) for gas, mol concentration (mol/l) for solute, and volume (liter) for catalyst and solid. Assuming that 3N caustic soda is used, $$[H_2]^2/3^2=3.050 \times 10^{82}$$

Accordingly, in theory, up to $[H_2]=5.239 \times 10^{41}$ [atm] can be achieved. In other words, according to the calculation based on the reaction formula, a pressure in the order of $10^{41}$ atm, which is almost infinite, is obtained. In general, the above reaction is reversible. However, because $H_2$ gas escapes from the reaction liquid, the reaction continues so as to compensate for the escaped $H_2$ gas, resulting in continued production of $H_2$ gas. The reaction is therefore considered to be irreversible.

It should be noted that, in the above-referenced related art, much water is employed in the reactions, and this water causes the reactions to be reversible, hindering achievement of irreversibility. According to the present invention, in contrast, particularly when water and the aqueous basic hydroxide solution are supplied in the stoichiometric amounts or similar amounts, the reaction occurs almost irreversibly, thereby producing high-pressure hydrogen having a pressure in the order of $10^{41}$ atm as described above.

EXAMPLES

Example experiments in which high-pressure hydrogen was produced using waste silicon are described below. In these experiments, a pressure-resistant reaction container having an internal volume of 1 liter was used. Considering safety, a safety valve was set to operate under 17 MPa. Because of this arrangement, high-pressure hydrogen could only be generated up to a pressure approaching 17 MPa. However, when materials are supplied in the stoichiometric amounts, for example, it is considered that a pressure of approximately 100 MPa can be achieved.

In Experiments 102 and 103 shown in Table 1, the temperature of the reaction container exceeded 50° C. in approximately 10 seconds without using heating means, and, after that point, the reaction proceeded explosively to generate a pressure approaching 17 MPa.

TABLE 1

| Experiment No. | Sample (purity, quantity) | NaOH solution (concentration, quantity, initial temperature) | Maximum temperature attained | Maximum pressure attained |
|---|---|---|---|---|
| 101 | waste silicon purity 96% 0.97 g | 1 mol/l 0.5 l 25° C. | 33° C. | 0.3 MPa |
| 102 | waste silicon purity 96% 7.2 g | 1 mol/l 0.5 l 25° C. | 75° C. | 2.2 MPa |
| 103 | waste silicon purity 96% 33.4 g | 5 mol/l 0.5 l 25° C. | 100° C. | 10.2 MPa |

When hydrogen having a pressure of several atm is produced as in a conventional method, pressurizing means (such as a pump) must be used in order to increase the pressure of hydrogen. In contrast, according to the present invention, pressurizing means is unnecessary because high-pressure hydrogen of about 10 MPa can be easily obtained.

In a conventional fuel cell including a hydrogen cylinder, the currently available pressure is 35 MPa, which results in a limited travel distance of approximately 200 kilometers. While it is necessary to provide a cylinder (container) having a higher pressure resistance, when employing the present invention together with a reaction container having high pressure resistance, hydrogen may be produced at a pressure of approximately 100 MPa or higher. By filling this hydrogen of 100 MPa as is into the cylinder, a travel distance equivalent to a conventional automobile may be achieved.

According to the present invention, hydrogen can be efficiently produced from silicon and an aqueous basic hydroxide solution using an apparatus having a simple structure.

What is claimed is:

1. A hydrogen production apparatus comprising:
    reacting means for reacting silicon and an aqueous basic hydroxide solution to produce hydrogen such that hydrogen produced by said reaction is obtained in a high pressure state exceeding 0.2 MPa at 25° C.;
    hydrogen storing means for storing hydrogen produced in said reacting means;
    retaining means for retaining a solid or liquid product generated in said reacting means; and
    dehydrating means for removing moisture from said product retained in said retaining means.

2. A hydrogen production apparatus as defined in claim 1, wherein said hydrogen storing means comprises a hydrogen absorbing alloy.

3. A hydrogen production apparatus as defined in claim 1, wherein said hydrogen storing means comprises a high-pressure cylinder.

4. An engine comprising a hydrogen production apparatus for reacting silicon and an aqueous basic hydroxide solution to produce hydrogen; and a fuel cell for generating electricity using hydrogen obtained from said hydrogen production apparatus;
    wherein said hydrogen production apparatus is a hydrogen production apparatus according to claim 1.

5. A vehicle having said engine according to claim 4 mounted thereon.

* * * * *